US009927949B2

(12) United States Patent
Gray et al.

(10) Patent No.: US 9,927,949 B2
(45) Date of Patent: Mar. 27, 2018

(54) RECOGNITION INTERFACES FOR COMPUTING DEVICES

(71) Applicant: Amazon Technologies, Inc., Reno, NV (US)

(72) Inventors: Timothy Thomas Gray, Seattle, WA (US); Marc Anthony Salazar, Seattle, WA (US); Steven Michael Sommer, Bellevue, WA (US); Charles Eugene Cummins, Seattle, WA (US); Sean Anthony Rooney, Seattle, WA (US); Bryan Todd Agnetta, Seattle, WA (US); Jae Pum Park, Bellevue, WA (US); Richard Leigh Mains, Seattle, WA (US); Suzan Marashi, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 848 days.

(21) Appl. No.: 14/137,783

(22) Filed: Dec. 20, 2013

(65) Prior Publication Data

US 2014/0337800 A1 Nov. 13, 2014

Related U.S. Application Data

(60) Provisional application No. 61/821,677, filed on May 9, 2013.

(51) Int. Cl.
*G06F 3/0481* (2013.01)
*G06F 3/0485* (2013.01)
*G06K 9/20* (2006.01)

(52) U.S. Cl.
CPC ........ *G06F 3/04817* (2013.01); *G06F 3/0485* (2013.01); *G06K 9/2081* (2013.01)

(58) Field of Classification Search
CPC ...... G06K 9/6253; G06K 9/00; G06K 9/0093; G06K 9/4671; G06K 2209/01;
(Continued)

(56) References Cited

U.S. PATENT DOCUMENTS 5,923,327 A 7/1999 Smith et al.
8,577,118 B2 * 11/2013 Nepomniachtchi .. G06K 9/3275
382/137

(Continued)

FOREIGN PATENT DOCUMENTS

JP 2000-137629 A 5/2000
JP 2001-005585 A 1/2001
(Continued)

OTHER PUBLICATIONS

"International Search Report and Written Opinion dated Oct. 8, 2014," International Application No. PCT/US2014/037598, 8 pages.

(Continued)

*Primary Examiner* — Tadeese Hailu
(74) *Attorney, Agent, or Firm* — Pierce Atwood LLP

(57) ABSTRACT

A computing device can utilize a recognition mode wherein an interface utilizes graphical elements, such as virtual fireflies or other such elements, to indicate objects that are recognized or identified. As objects are recognized, fireflies perform one or more specified actions to indicate recognition. A ribbon or other user-selectable icon is displayed indicates a specific action that the device can perform with respect to the respective object. As additional objects are recognized, additional ribbons are created and older ribbons can be moved off screen and stored for subsequent retrieval or search. The fireflies disperse when the objects are no longer represented in captured sensor data, and can be animated to move towards representations of new objects as (Continued)

features of those objects are identified as potential object features, in order to communicate a level of recognition for a current scene or environment.

17 Claims, 9 Drawing Sheets

(58) Field of Classification Search
CPC .... G06K 9/6255; G06K 9/2081; G06F 3/017; G06F 17/30265; G06F 3/0304; G06F 3/0485; G06F 3/0482; G06F 3/0487; G06F 2200/1637; G06F 3/04817
See application file for complete search history.

(56) References Cited

U.S. PATENT DOCUMENTS

| | | | |
|---|---|---|---|
| 8,704,948 B2* | 4/2014 | Mountain | H04N 21/44008 348/564 |
| 2001/0028367 A1 | 10/2001 | Saitoh | |
| 2002/0044128 A1 | 4/2002 | Hayashi | |
| 2009/0073194 A1 | 3/2009 | Ording | |
| 2009/0132590 A1 | 5/2009 | Huang | |
| 2010/0278453 A1* | 11/2010 | King | G06Q 10/10 382/321 |
| 2010/0331041 A1* | 12/2010 | Liao | H04M 1/72555 455/556.1 |
| 2011/0010650 A1 | 1/2011 | Hess et al. | |
| 2011/0025842 A1* | 2/2011 | King | G06F 17/211 348/135 |
| 2011/0035662 A1* | 2/2011 | King | G06F 17/211 715/273 |
| 2011/0161875 A1* | 6/2011 | Kankainen | G06F 3/0481 715/810 |
| 2011/0164163 A1 | 7/2011 | Bilbrey et al. | |
| 2011/0167382 A1 | 7/2011 | van Os | |
| 2011/0234386 A1 | 9/2011 | Matsuda | |
| 2011/0243397 A1* | 10/2011 | Watkins | G06F 17/30259 382/118 |
| 2012/0088543 A1* | 4/2012 | Lindner | G06F 17/289 455/556.1 |
| 2012/0105474 A1* | 5/2012 | Cudalbu | H04W 4/02 345/633 |
| 2012/0105475 A1* | 5/2012 | Tseng | G01C 21/3611 345/633 |
| 2012/0165078 A1 | 6/2012 | Mikami | |
| 2012/0230540 A1* | 9/2012 | Calman | G06K 9/00221 382/103 |
| 2013/0022284 A1 | 1/2013 | Zheng | |
| 2013/0138343 A1* | 5/2013 | Choi | G01C 21/3679 701/527 |
| 2013/0150124 A1* | 6/2013 | Kim | H04W 64/00 455/556.1 |
| 2013/0194258 A1* | 8/2013 | Lin | G09B 29/007 345/419 |
| 2013/0282532 A1* | 10/2013 | Shihadah | G06Q 30/0641 705/27.1 |
| 2014/0016825 A1 | 1/2014 | Kasahara | |
| 2014/0267770 A1* | 9/2014 | Gervautz | H04N 5/23296 348/169 |

FOREIGN PATENT DOCUMENTS

| | | |
|---|---|---|
| JP | 2001-184153 A | 7/2001 |
| JP | 2001-312420 A | 11/2001 |
| JP | 2007-303878 A | 11/2007 |
| JP | 2010-015360 A | 1/2010 |
| JP | 2010-067104 A | 3/2010 |
| JP | 2011-209965 A | 10/2011 |
| JP | 2012-137821 A | 7/2012 |
| JP | 2012-221250 A | 11/2012 |
| WO | 2012099558 A1 | 7/2012 |

OTHER PUBLICATIONS

Extended European Search Report, dated Nov. 21, 2016, Applicant: Amazon Technologies, Inc., 11 pages.
Flow by Amazon iPhone app demo: Augmented reality meets shopping; https://www.youtube.com/watch?v=ThUQyi0BO_k, Nov. 2, 2011.
Video demonstration of Amazon Flow image recognition app for iPhone and iPad; https://www.youtube.com/watch?v=hrBr-Ln8bmo, May 26, 2013.
Parish, Joseph, A9's Flow app is augmented reality Amazon shopping; https://www.theverge.com/2011/11/3/2535286/a9-flow-app-augmented-reality-amazon-shopping, The Verge, Nov. 3, 2011.
Oct. 13, 2017 Office Action from Japanese Patent Application No. 2016-513136 (with english translation).
Office Action Issued in EP Patent Application No. 14 794 394.8, dated Dec. 12, 2017.

* cited by examiner

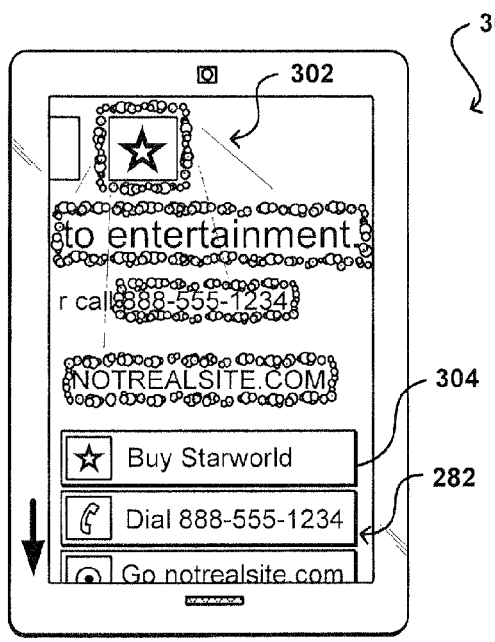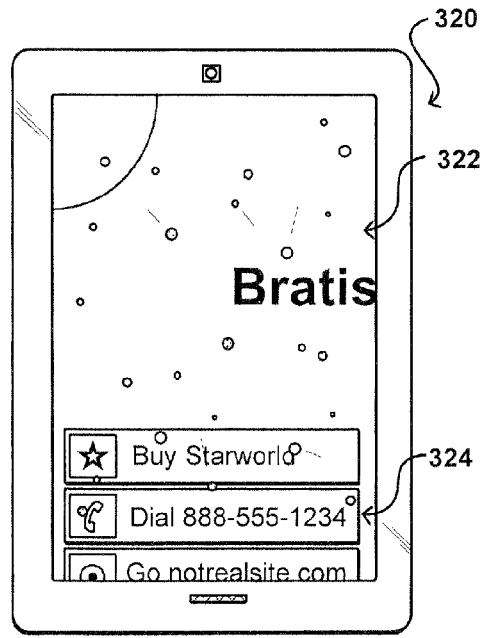
FIG. 3(a) FIG. 3(b)
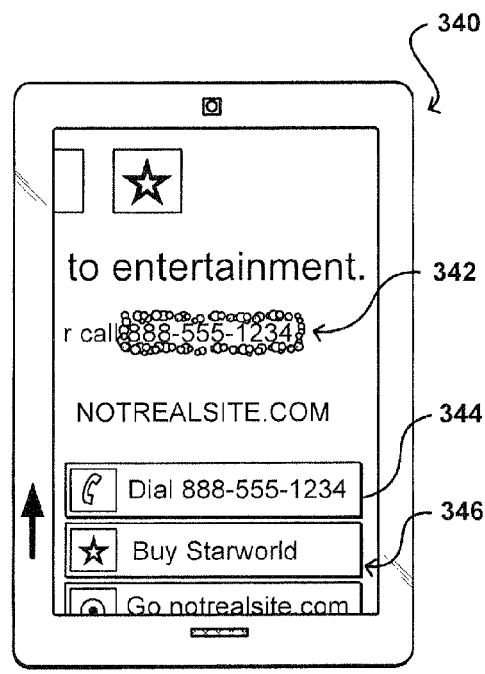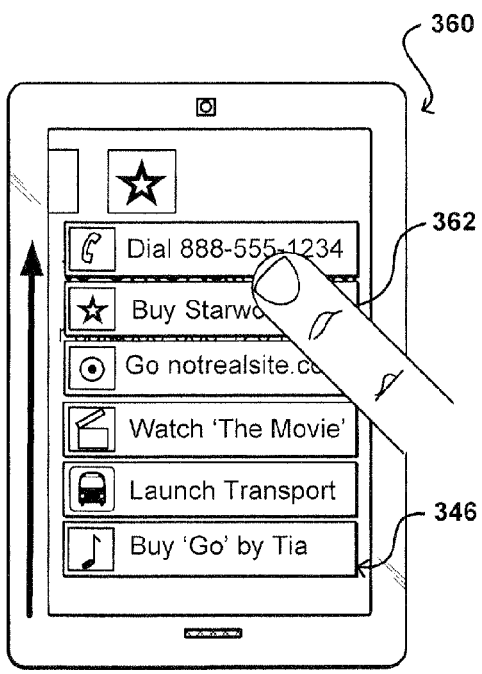
FIG. 3(c) FIG. 3(d)

RECOGNITION INTERFACES FOR COMPUTING DEVICES

CROSS-REFERENCE TO RELATED APPLICATIONS

This application claims priority to U.S. Provisional Patent Application Ser. No. 61/821,677, entitled "Mobile Device User Interface—Camera," filed May 9, 2013, which is hereby incorporated herein by reference, in its entirety and for all purposes.

BACKGROUND

People are increasingly utilizing portable electronic devices to perform a wide variety of tasks. As an example, people can utilize a camera of such a device to capture an image of an object. For example, a user can use a camera to capture a still image or video on things in the environment in the camera's field of view. There might be multiple objects in an image or video, and the user may not be able to determine what the objects are or know much about them.

BRIEF DESCRIPTION OF THE DRAWINGS

Various embodiments in accordance with the present disclosure will be described with reference to the drawings, in which:

FIGS. 3(a), 3(b), 3(c), and 3(d) illustrate an example interface wherein actions for recognized objects can be updated or accessed in accordance with various embodiments;

DETAILED DESCRIPTION

Systems and methods in accordance with various embodiments of the present disclosure may overcome one or more of the aforementioned and other deficiencies experienced in conventional approaches to imaging objects in the environment and learning more about them. In particular, various embodiments enable a computing device to analyze information, such as sensor data captured by one or more sensors of the computing device, to attempt to identify one or more objects represented in the information. Sensor data can include, for example, images or video data captured by a camera, audio captured by a microphone, position data captured by a global positioning system, and any other appropriate data capable of being acquired by one or more sensors (or other such components) of a computing device. The represented objects can include tangible and/or intangible objects, such as may include, for example, text strings, bar codes, songs, movies, products, locations, people, weather-related information, and other types of items, events, and/or occurrences. Various embodiments also provide an interface that enables the device to convey which objects have been recognized, such as by displaying a set of virtual "fireflies" or other types of graphical elements over a live view of image (e.g., video) information being captured by the device. Various embodiments also can determine one or more actions that can be performed for certain objects, and can provide selectable options enabling a user to instruct the performance of any of those actions. The interface can also retain or archive information for at least some of those actions such that a user can cause those actions to be performed whether or not the corresponding object is within a field of view of a camera, being received by a microphone, or otherwise being currently detected by at least one sensor or other such component of the computing device.

Various other applications, processes, and uses are presented below with respect to the various embodiments.

Figure 1A:
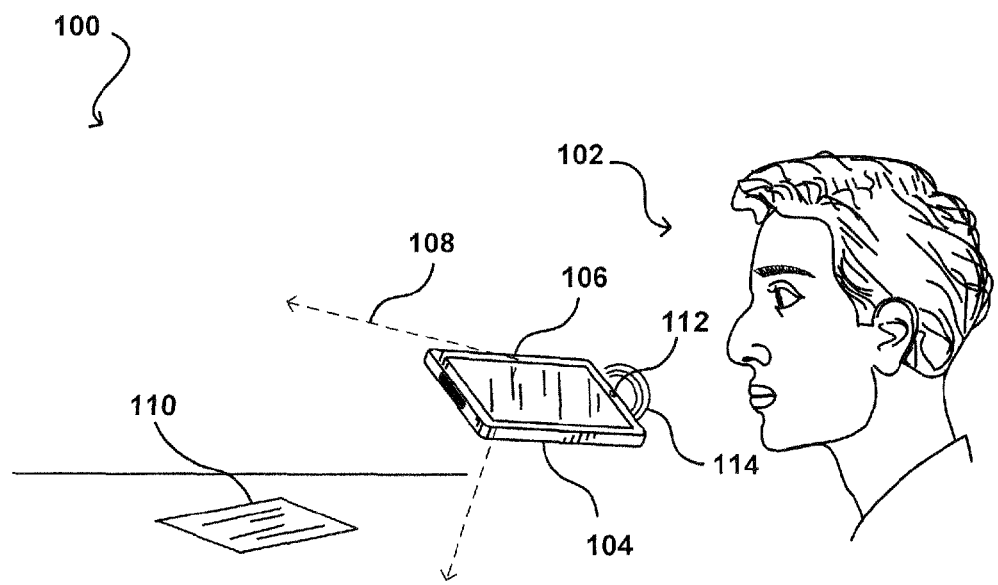
FIGS. 1(a) and 1(b) illustrates an example of a user using a portable computing device to capture an image of an object that can be utilized in accordance with various embodiments.

FIG. 1(a) illustrates an example situation 100 wherein a user 102 is interacting with a computing device 104. Although a portable computing device (e.g., a smart phone, an e-book reader, or tablet computer) is shown, it should be understood that various other types of electronic devices that are capable of determining and processing input can be used in accordance with various embodiments discussed herein. These devices can include, for example, desktop computers, notebook computers, personal data assistants, cellular phones, video gaming consoles or controllers, smart televisions, a wearable computer (e.g., a smart watch or glasses), and portable media players, among others. In this example, the computing device 104 has at least one image capture element 106, such as a camera or camera sensor, operable to perform functions such as image and/or video capture. Each image capture element may be, for example, a charge-coupled device (CCD), a motion detection sensor, or an infrared sensor, or can utilize another appropriate image capturing technology. In this example, the user 102 is interested in obtaining information about a particular document 110. This could include, for example, information contained in the document or information about the document itself, among other such information. The device can include other sensors for capturing information as well, such as at least one microphone 112 operable to capture audio data 114 or a position sensor for acquiring position data, among others.

In this example, the document 110 contains information that might be of interest to the user. This information includes, for example, a body of text, a phone number, and a web address. The user might want to acquire any or all of this information for any of a number of reasons, such as to update contact information, call the number, access a Web site associated with the address, and so on. In order to obtain this information, the user can position the computing device 104 such that at least the relevant portion of the document 110 is within a field of view 108 of at least one camera 106 of the computing device. The resulting image can then be displayed on a display screen 122 of the computing device, as illustrated in the example situation 120 of FIG. 1(*b*). The image 122 can be a still image that was captured by the camera, or can be a frame of a "live" view as captured by a video mode of the camera, camera mode of the device, etc. As illustrated, the image 122 can include information 124 from the document. Each instance of captured information can be referred to as an "object," which can be analyzed by software running on, or remote from, the device. In this example, the objects that can be recognized from the image can include objects such as a string of text 126, a phone number 128, and a web address or URL 130. Various other types of object can be detected in other examples as discussed and suggested elsewhere herein. The image can be processed to attempt to recognize the text, which then can be utilized by the user for any of a number of different purposes.

Using a conventional approach, the user can cause the image to be captured and uploaded to a server that is capable of running one or more image recognition or analysis algorithms on the image to attempt to identify text within the image. This can include, for example, at least one optical character recognition (OCR) algorithm. Oftentimes, however, the image that is captured will not be of sufficient quality to recognize the object that is of interest to the user. For example, the image might be out of focus or blurry, or part of the image might be obscured. Further, sometimes the recognition algorithm will only be able to recognize a portion of the image, which may or may not include the portion that is of interest to the user. Since the user is uploading the image to a server, the user has to wait for the image to be uploaded and analyzed before determining whether the relevant information was recognized, and whether it was recognized properly. If not, the user must cause another image to be analyzed and hope that the desired result is returned. This process can be inefficient and potentially frustrating to a user.

Accordingly, approaches in accordance with various embodiments can provide an interface that enables a user to determine which objects have been recognized, such that the user can make near real-time adjustments in order to cause the device to recognize the object(s) of interest. Such an interface can indicate each such object that has been recognized, and can provide information about that object as applicable. Further, if that object is an actionable object, or a type of object with which an action is associated, for example, the interface can enable that action (or any of a number of associated actions) to be performed with respect to the object. As mentioned elsewhere herein, in some embodiments an action can be enabled to be performed for any recognized object, regardless of type, or a subset of recognized objects. In at least some embodiments, information for these actions can be stored, retained, or otherwise archived such that a user can cause that action to be performed whether or not the object is still recognizable by the device. This can include, for example, a situation where the object is no longer in a field of view of a camera or detectable by a microphone or other sensor or component of the device. Such an interface can be provided as part of the operating system, as part of the camera software/hardware, or as part of an application sitting on top of the camera stack, among other such options.

Figure 1B:
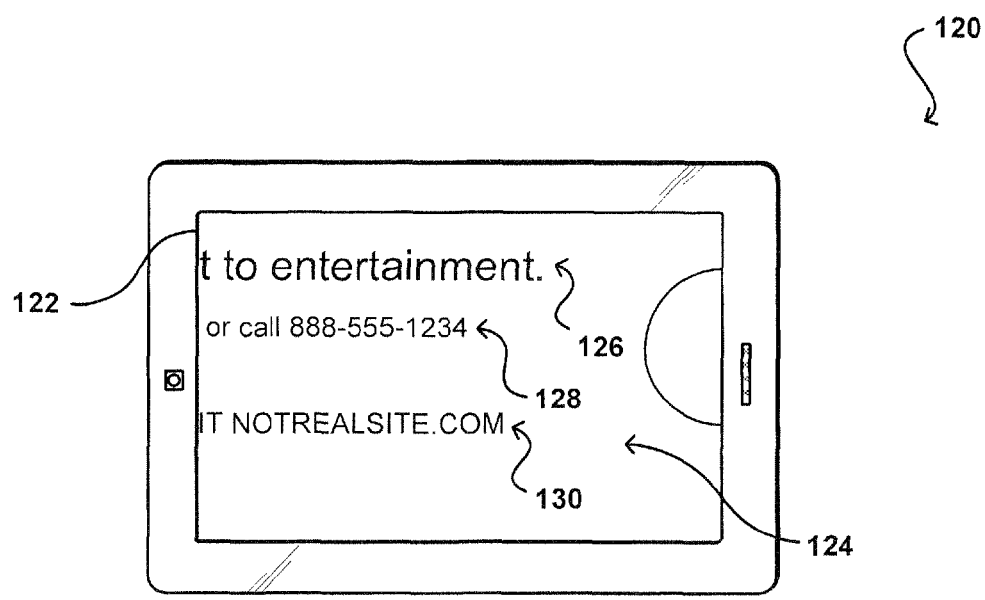

For example, FIG. 2(*a*) illustrates an example situation 200 wherein the portion of the image from FIG. 1(*b*) is again displayed as a live view of the document of interest to the user. In this example, however, the user is able to press a physical button 202, or provide another such physical or virtual input, to cause a recognition mode to activate on the device. As discussed elsewhere herein, a computing device can generate video data while in a camera mode, but can also attempt to analyze that data to recognize one or more objects while in a recognition mode. It should be understood that other types of operation for recognition or other such purposes can be utilized as well, and that other activation mechanisms can be used or the recognition can be launched automatically, among other such options. In this example, the recognition mode (as well as the camera mode in at least some embodiments) uses what will be referred to herein as "fireflies" 208. The fireflies can be animated to function as a set of virtual indicators that can "float" above a live camera view, still image, or other such content presented via a display 204 or other such element of the computing device. Fireflies can be used to communicate information to the user, such as whether the device is tracking objects properly or if tracking has been lost, whether or not objects are recognized, and/or whether the image is adequate to identify features in the image, among other such options. Each firefly can be a group of pixels that pulsate or alternate in brightness like a firefly, or can comprise an actual image or animation of a firefly, bulb, insect, or other such creature or object that can move about the screen. Various other objects, icons, images, animations, or graphics can be used as well within the scope of the various embodiments.

Some fireflies can be animated to move about the screen, while some can be caused to appear to flash in place, either once or a number of times. There can be a fixed number of fireflies on a screen at any given time, or a variable number that can depend on any of a number of different factors. There can be some fireflies that flash in place while other fireflies move, in order to give the impression of a group of living organisms without the impression of swarming or other motions that may be somewhat disconcerting to a user. In some embodiments, the fireflies can be small points or circles that flash from invisible or transparent to a bright white or yellow light, for example, similar to how fireflies light in nature. Other appearances can be used as well, along with different colors, sizes, brightness values, etc. In order to give a more natural appearance, different fireflies on the same display might also have different brightness levels, intensities, colors, distances, sizes, and the like. In at least some embodiments a user (or developer or application, etc.) can be enabled to change the appearance or behavior of the fireflies, among other such aspects. When entering a recognition mode, in at least some embodiments, any chrome or interface associated with the camera can be removed, reduced in size or scope, or otherwise modified to further indicate that the device has entered a different mode of operation. In at least some embodiments, the audio of the device can also be adjusted when fireflies perform different operations, such as to emit a louder buzzing noise when moving or emit little to no buzzing when a bounding box is created. Further, different buzzing sounds can be used when fireflies are animated differently, such as to display a first buzzing noise (or provide a first amount of vibration) when the fireflies are animated to disperse across at least a portion of a display, and a different buzzing noise (or amount of vibration) when the fireflies are proximate a representation of an object or a launch button, among other such options.

In at least some embodiments, the fireflies can be animated, rendered, or otherwise caused to appear to act with at least some level of intelligence. For example, as illustrated in FIG. 2(*a*), while no part of the image information 206 has been recognized, the fireflies can be caused to relatively randomly move or hover about the screen (as completely random movement may not appear natural).

There can be some related behavior among the movements in at least some embodiments to give the impression of a group of intelligent creatures. While the fireflies are moving about the display, for example, the computing device (or a computer in communication with the computing device) can analyze at least a portion of the image and/or video to attempt to recognize one or more objects represented in the image, or "visual representations" of the corresponding objects contained in the image. For example, the text string "to entertainment" might be recognized by an OCR engine or other such component or process. In response to recognizing that object, some or all of the fireflies can be rendered to form an animated shape, such as by being animated to appear to move across the display and form an animated bounding box 222 proximate the representation of the recognized object as illustrated in the example situation 220 of FIG. 2(b). The fireflies in the animated shape can be animated to change in motion and/or appearance, such as by changing in brightness and/or intensity, as well as to change in an amount or type of motion. In some embodiments, fireflies can be animated in a first state when no information is to be conveyed and a second state when information is to be conveyed, where the first and second states can vary in aspects such as maximum brightness, average intensity, color range, average brightness, density, flashing rate, and the like. As mentioned, some of the fireflies might appear to move and some might just appear near the representation of the object in order to prevent the appearance of swarming in at least some embodiments. The result of the fireflies creating a bounding box 222 around the string of text can indicate to the user that the text has been recognized, at least as a string of text or recognizable object. If the user is interested in this text, the user can then take an appropriate action, such as by touching the display 204 near the text or bounding box in order to perform an action such as to copy the text. If the fireflies had not appeared around the text, but instead moved relatively randomly about the display, the user could determine that the image was not sufficient for the device to recognize the text and could perform an action such as to move the camera, move the object, adjust the lighting, change the zoom or focus, etc.

In some embodiments, different recognition algorithms and/or services might be used to recognize different types of objects. For example, a string might be recognized as text that matches a determined pattern, such as a pattern indicating the text is a phone number or URL. Accordingly, information for these objects might be processed by a different algorithm or process. The different types of processing therefore can result, in at least some embodiments, in different objects being recognized at different times. Similarly, different objects might be recognized at different times due to changes in the image that enable different portions to be recognized at different times, among other such options.

Figure 2A:
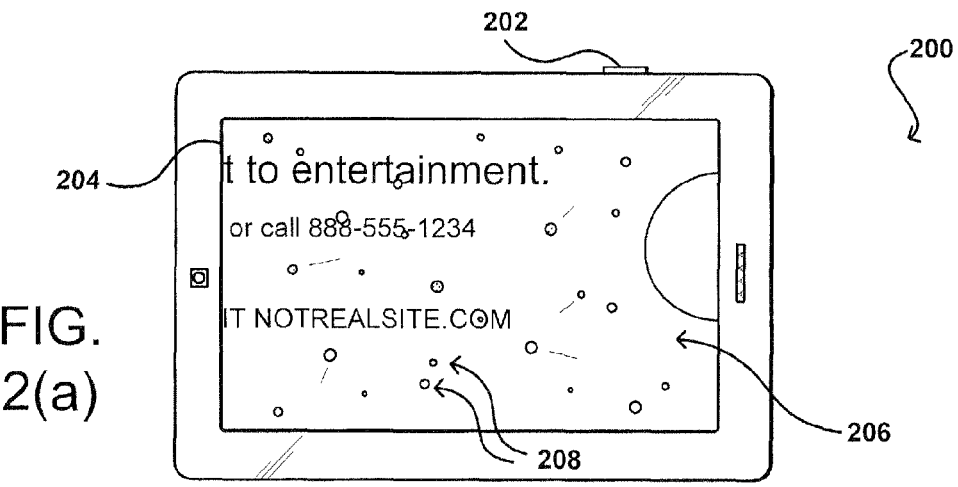
FIGS. 2(a), 2(b), 2(c), 2(d), and 2(e) illustrate an example interface that conveys to a user which objects are recognized in a current view, as well as actions that can be accomplished using those objects, that can be utilized in accordance with various embodiments.
Figure 2B:
Figure 2C:
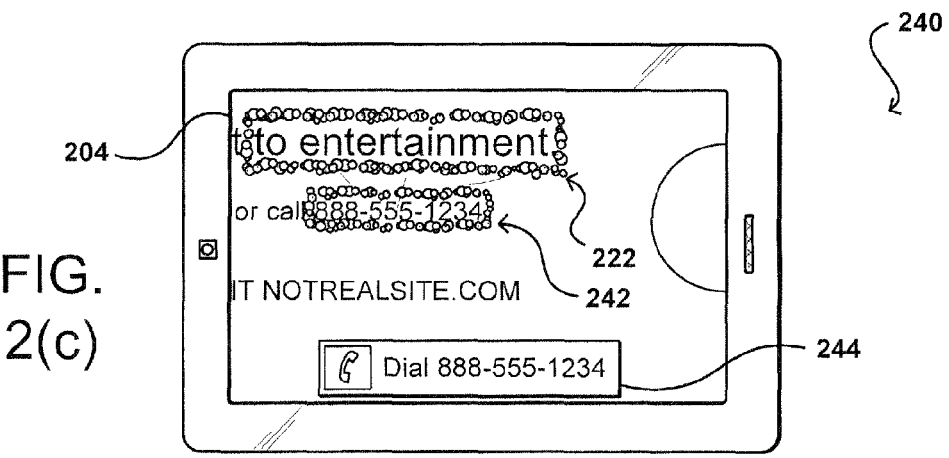

In response to a second object being recognized, as illustrated in the example situation 240 of FIG. 2(c), a portion of the fireflies (either from the first bounding box 222 or additional fireflies, or a combination thereof) can be caused to create a bounding box 242 or other such indication about the second recognized object, here a phone number. In at least some embodiments, some of the fireflies can be animated to move from the first bounding box 222 to the second bounding box 242. Such presentation can indicate to the user that both objects have been recognized and/or identified. In different embodiments, the fireflies can bound the phone number at different times, such as when the string is identified as a text string, when the string is identified as a phone number, or when information for the phone number is located, among other such options. Various approaches can be used to attempt to recognize and identify objects, as well as to determine the types of those objects and applications or actions that correspond to those types of objects, as is known or used in the art. For example, various computer vision algorithms can be used to attempt to locate, recognize, and/or identify various types of objects in an image or video sequence. Computer vision algorithms can utilize various different approaches, as may include edge matching, edge detection, recognition by parts, gradient matching, histogram comparisons, interpretation trees, and the like.

In various embodiments, a type of the object can also be determined. In at least some embodiments, this can include at least an "actionable" or a "non-actionable" type, or equivalent(s). For example, a text string such as "to entertainment" might be a portion of text that can be handled as normal text, such as for copying and pasting, which might not be considered an actionable object in at least some embodiments (while being considered actionable in others). Objects such as a phone number or URL might be considered to be actionable objects as the computing device can perform at least one specific function with respect to each of these objects that might be of interest to a user. For each actionable object, every recognized object, or at least one recognized actionable object, for example, the interface can provide a user-selectable input, icon, or element associated with the representation of that object. In other embodiments, a user-selectable input or element might be provided for each recognized object, or a specific subset of recognized objects, among other such options. Objects such as barcodes and QR codes might be considered either actionable or not actionable objects in different embodiments. Similarly, objects such as songs might be considered actionable if the software is linked to a song identification and/or purchasing source, and text might be considered actionable if a translation is available.

In various embodiments, the user-selectable icon can take the form of what will be referred to herein as a "ribbon" 244, although various other types of elements or objects can be utilized as well within the scope of the various embodiments as discussed and suggested elsewhere herein. In this embodiment, a ribbon 244 is comprised of at least two parts: information about the object and information about at least one action that can be taken. As illustrated, the ribbon can list the phone number that was recognized, such that the user can determine whether the phone number was properly recognized before using the number. The ribbon can also identify the action that can be taken, in this case using a phone icon and including the word "dial," although various other indications can be used as well. In some embodiments the user might be able to select from different options or cause a specific action to be associated with a type of object, such as where a user would like to send a text or make a Skype® video call instead of a conventional phone call, among other such options. In some embodiments, a ribbon might have two touch targets: a first target that comprises approximately 80% of the area of the ribbon that enables the user to select the primary action, and a second target of approximately 20% of the ribbon area that enables the user to go to a detail card, or other such element, that provides other actions or plugins applicable to that object, as well as potentially a copy of the image that was used to recognize the object for context, among other such possibilities. As discussed, a ribbon in some embodiments can include at least three things to display: an image relating to the object, a title or name of the object, and a source of disambiguation, such as an author or artist name to help a user distinguish that object from other objects with the same or similar names or titles, etc. Ribbons (or other user-selectable icons) can also provide different actions for various types of objects. For example, a ribbon can include an action to purchase or download a song that was recognized from audio data, or to play a movie that was recognized from audio data and/or video data captured by one or more sensors of the device.

In this example, the ribbon is displayed near the "bottom" of the display for the current orientation, although other places can be utilized as well. In at least some embodiments, the ribbon 244 can remain on the screen for at least a determined period of time, whether or not the corresponding representation of the object is still visible in the display or otherwise accessible to the device. For example, a user might point the camera towards the number in order to have the phone number accessible via the device. Once captured and/or recognized, the user might no longer want to continue to hold the device with the number in the field of view of the camera, and might want to bring the camera to a more comfortable position in order to touch the ribbon or otherwise check and dial the number. In some embodiments, the user might want the device to store the number to dial at a later time that is more convenient for the user. In any of these or other such cases, it can be desirable for the device to display the ribbon for a period of time, or at least enable the user to access the ribbon at the appropriate time.

Figure 2D:
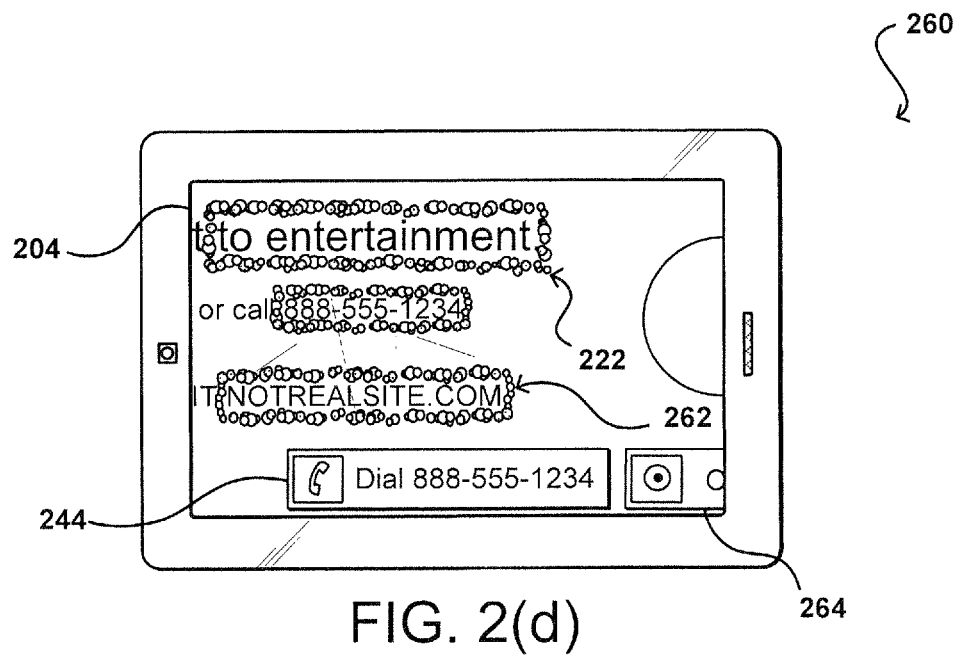

As illustrated in the example situation 260 of FIG. 2(d), the device might recognize additional objects as well, such as by using additional algorithms, plugins, services, or processes or when the portion or quality of the captured image changes, among other such options. In this example, another object is detected, which causes an additional bounding box 262 to be created by the fireflies. Since the object is actionable, an additional ribbon 264 can be created that enables the user to cause a specific action to be performed with respect to the newly recognized object. In some embodiments where multiple actions can be performed with respect to an object, multiple ribbons can be displayed on the display screen. In other embodiments, a ribbon might have more than one label, with each label referring to a different possible action. For example, the sensor data might include a representation of a movie theater sign, a newspaper advertisement, musical sounds and/or various other objects, where a user might want to call (e.g., for reservations/tickets) or learn more information about the object (see artist's website, watch movie trailers, view menu, etc.) before doing so. Labels also can indicate functionality such as an ability to visit a third party's social media page (e.g., a Facebook page for a restaurant or musical artist represented in the poster/ad). In the illustrated example the first ribbon is displayed in a center portion of the display with additional ribbons added to the right, although in other embodiments the newer ribbons can be presented in the center and can be animated to appear to "push" the older ribbons to the right or left, among other such options. In order to access the other ribbons, then, the user can swipe, scroll, or otherwise navigate to those ribbons using any of a number of navigational approaches used for such purposes.

Figure 2E:
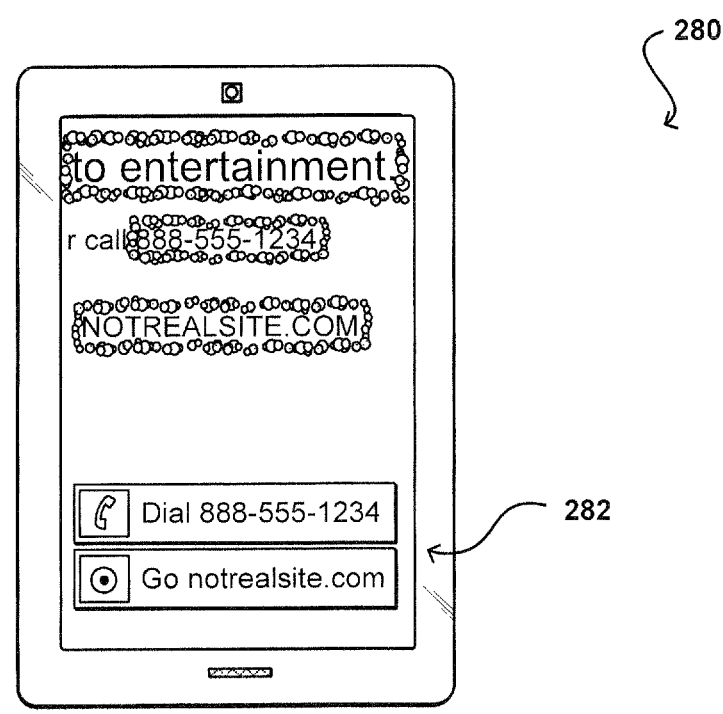
Figure 4A:
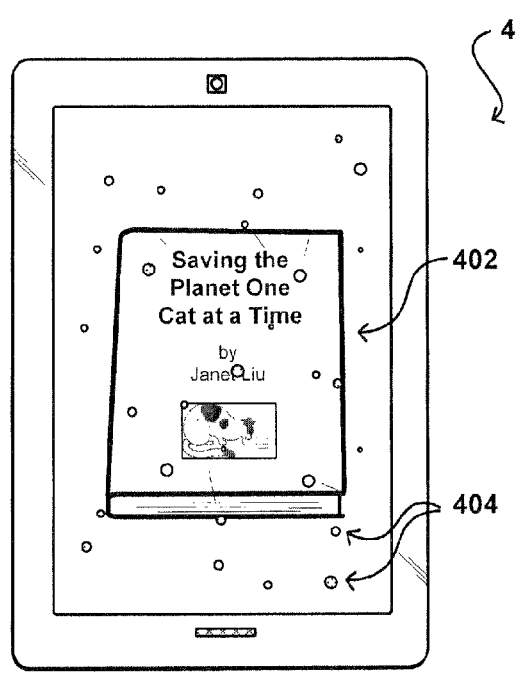
FIGS. 4(a), 4(b), 4(c), and 4(d) illustrate an example interface enabling a user to perform an action for a recognized object that can be utilized in accordance with various embodiments.
Figure 4B:
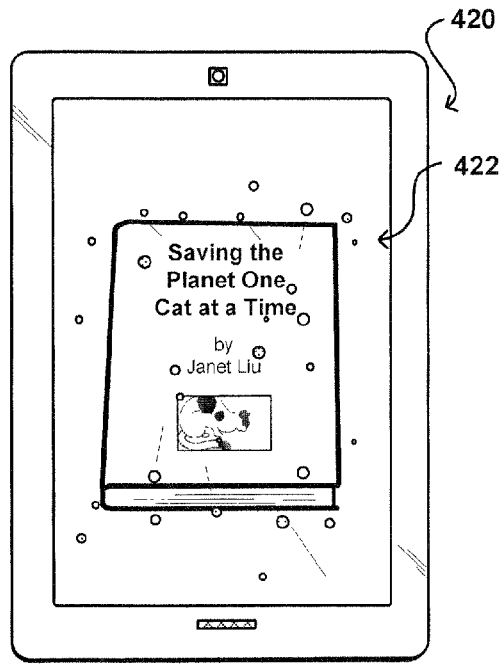
Figure 4C:
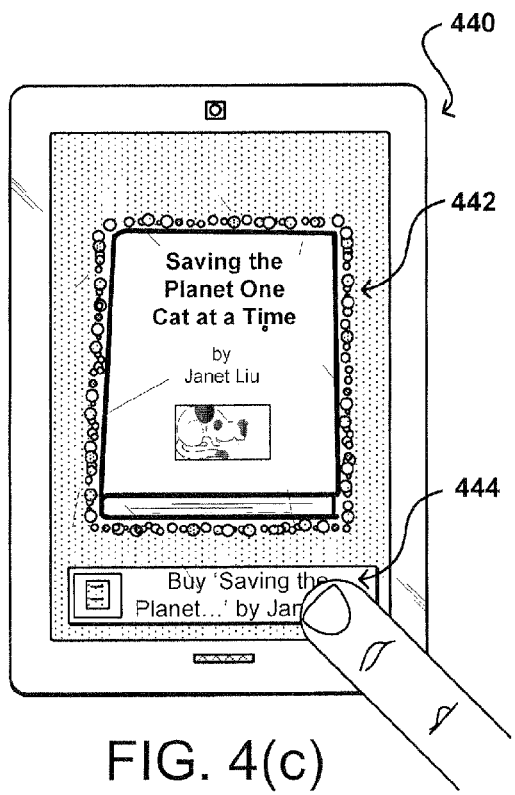
Figure 4D:
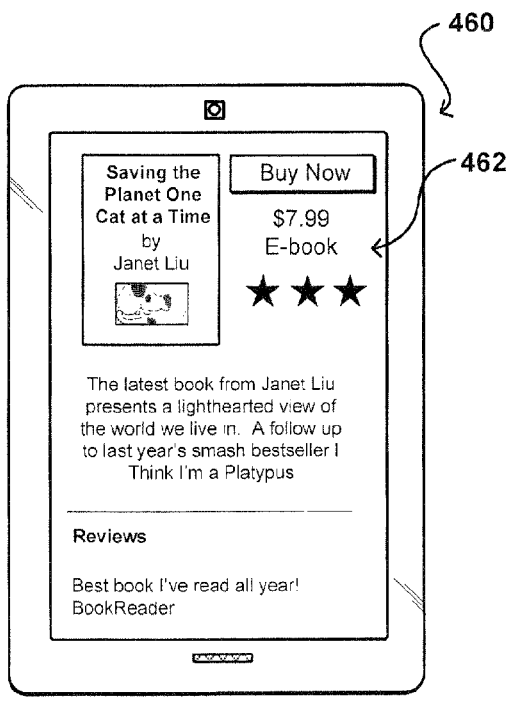

As illustrated in the example situation 280 of FIG. 2(e), the ribbons 282 can also be displayed to appear to be stacked vertically on top of one another, among other such options. In this example, the first ribbon appears on top with the others appearing below, while in other embodiments the most recently generated ribbon can always appear on top, among other such options. As new ribbons are generated and the number of ribbons exceeds the number of ribbons that can be displayed, as may be a fixed, variable, or user-configurable number, for example, the older ribbons can be "pushed" off screen, but available to the user via one or more navigational approaches as discussed elsewhere herein. Various other approaches for displaying, moving, and navigating ribbons or other selectable elements can be utilized as well within the scope of the various embodiments.

As additional objects are recognized, the fireflies can identify the representations of those objects and additional ribbons can be provided. For example, in the situation 300 of FIG. 3(a), the device and/or document have been moved such that a different portion of the document is within the field of view of the camera, such that a slightly different live view is provided via the display of the device. In the updated live view, an additional object representation is identified causing a portion of the fireflies to create a bounding box 302 around that representation to indicate that the object has been recognized. The object has been identified as a product (e.g., a movie, book, or application) that can be purchased by the user. For example, the recognition might have identified the object representation as corresponding to an image of a product, and a look-up against a product data store could have been performed in order to provide information about that product to the user. As a result, another ribbon 304 can be presented to the user, such as at the top of the stack, which can cause the previously displayed ribbons 282 to move "down" (or otherwise make room for the new ribbon) on the display. The new ribbon can include an image of the identified product, for example, as well as a link or other selectable mechanism for enabling the user to purchase or otherwise obtain the product, either with a single click or with another process known or used for electronically purchasing an item. As mentioned, the fireflies that create the new bounding box 302 can move from the previously displayed bounding boxes, can appear as new fireflies, or a combination thereof. In some embodiments the fireflies can also fly in from off screen, or perform another such action or motion.

As mentioned, it might be the case that the user might not keep the objects within the field of view of one of the cameras or sensors on the device, such as when the device has recognized an object and the user wants to act on that object using a more comfortable position of the device. As an example, in the situation 320 of FIG. 3(b) the live view 322 no longer displays any of the previously identified object representations, and in this case does not include any identifiable object representations (other than potentially a partial text string in some embodiments). As illustrated, since there are no longer any representations to bound, the fireflies can again scatter, disperse, or otherwise move around the display as previously mentioned. As discussed, the fireflies can attempt to find features that might correspond to recognizable objects, as may include edges, corners, sharp transitions of color or brightness, and the like. As illustrated, however, the ribbons 324 can remain on the display for at least a period of time. As discussed, this can enable a user to select one of the identified actions whether or not the corresponding object is still detectable by the computing device.

In the example situation 340 of FIG. 3(c), the device has been moved such that the previously analyzed portion of the document is again contained within the field of view of the camera and visible in the live view. As discussed previously, the algorithms can again analyze the image to attempt to recognize and/or identify objects represented in the image. As discussed elsewhere herein, a different approach may be used if motion tracking or other mechanisms enable the device to determine that it has already recognized objects for that live view, which can save at least some processing for having to re-determine the presence of various objects in the acquired image. As discussed previously, the algorithms will again begin to detect objects, and a bounding box 342 can be formed by the fireflies around the representation of each identified object. In this example, the device might recognize the phone number and, based upon stored information about that number or stored information about the contextual information around that number, for example, the device can determine that a ribbon has already been generated for that ribbon. In such an instance, at least some embodiments can cause that ribbon 344 to be brought to the top of the ribbon stack 346 such that the corresponding action is readily accessible to the user. If this is the first time that the action for the number has been determined, or this particular action has been determined, a new ribbon can be generated and placed at the top of the stack, or in another appropriate location. If the ribbon has already been generated, then that ribbon can be displayed at the desired location. The other ribbons in the ribbon stack 346 can then be moved down or otherwise adjusted as discussed and suggested elsewhere herein.

In some instances, a user might want to access one of the previously-generated ribbons without having to again cause the device to recognize an associated object. As illustrated in the example situation 360 of FIG. 3(d), interfaces in accordance with at least some embodiments can enable a user to access previously-generated ribbons in order to locate the desired ribbon and/or action. In this example, the user is able to use a finger 362 or other such object to navigate through the ribbon stack 346 in order to locate a particular ribbon, or at least view one or more previously-generated ribbons. The user can use a touch screen to scroll down through the ribbon stack, although other navigational approaches can be used as well as would be apparent to one of ordinary skill in the art in light of the teachings and suggestions contained herein. These can include, for example, using a stylus or physical buttons, tilting the device, providing gesture or motion input, and the like. The user can then select an action associated with one of the previously-generated ribbons. In at least some embodiments a user can perform other tasks with respect to the ribbons, such as to delete or modify a ribbon, reorder ribbons, combine or copy ribbons, and the like. As illustrated, the ribbons (or other user-selectable icons) can provide different actions for various types of objects. For example, a ribbon can include an action to purchase or download a song that was recognized from audio data, or to play a movie that was recognized from audio data and/or video data captured by one or more sensors of the device.

FIGS. 4(a) through 4(d) illustrate another example interface that can utilize fireflies and ribbons to enable a user to perform an action with respect to a recognized object in accordance with various embodiments. In this example, as illustrated in the situation 400 of FIG. 4(a), a user might be interested in obtaining information about a particular item, in this case a book 402. As discussed elsewhere herein, the user can have (or place) the device in a discovery mode, or otherwise have the camera capturing image information that can be analyzed to attempt to recognize one or more objects in a field of view of the camera. In this case, an image of the book 402 is captured by the camera and the image is displayed in the live view on the display of the computing device. As mentioned previously, the device can display a group of fireflies 404 that, at least initially, can move or flash about the display screen at relatively random (or at least somewhat scattered) fashion. In some embodiments, one or more algorithms executing on the device can begin to locate features in the live view that might correspond to recognizable objects. As discussed, these can include things like edges, transitions, end points, and other features or aspects that can be used for tasks such as computer vision and image recognition as known or used in the art. In the example situation 420 illustrated in FIG. 4(b), at least some of the fireflies 422 can begin to move towards at least some of these features as they are identified. For example, since the edges of the book will likely be detected as potential recognizable features, at least some of the fireflies 422 can begin to move and/or appear near the edges of the representation of the book. Such an approach can provide the impression that the fireflies are intelligent and are attempting to identify objects represented in the image. Such an approach also can provide feedback to the user as to the features the device is identifying, in case a representation of an object in which the user is interested is not "attracting" fireflies, whereby the user can know to adjust the view, focus, lighting, or some other aspect to attempt to improve the recognition. Once the object is identified, the fireflies can move to create a bounding box 442 or other indication about the representation of the object, as illustrated in the example situation 440 of FIG. 4(c). In some embodiments, as illustrated, other portions of the live view can appear to darken, change in color or brightness, or otherwise be modified to further highlight the portion of the image that corresponds to a recognized object. In this example, the object was identified as a book available for purchase, whereby a ribbon 444 is displayed on the display screen. The ribbon in this example includes an image of the book, as may be obtained from a product data store, and the ability to purchase or obtain additional information about the book. In this example, the user is able to select the ribbon 444 to cause the device to navigate to a web page 462 that enables the user to purchase a copy of the book, as illustrated in the example situation 460 of FIG. 4(d). If the user had already purchased a copy of the book in electronic form, for example, the ribbon could instead provide an action that, when selected, causes the e-book to be displayed in an e-book reader application, for example. Various other actions can be taken as well.

In many instances, as mentioned, there can be multiple actions that can be taken. For example, a phone number might be used for text messaging, a voice call, or a video call. If a URL contains a foreign word, actions might include opening the URL in a Web browser or translating the word. Various other actions can apply as well. Accordingly, in at least some embodiments the types of action may be selectable by a user, or the algorithms for suggesting these actions might be ranked or otherwise prioritized. For example, an object being recognized as a URL might always take precedence over the object being identified to contain a foreign term, as the user will be more likely on average to want to follow the URL than to translate it. In some cases, such as where a user can make a voice, video, or VoIP call, for example, the device might analyze the user's historical usage or present the user with options or preferences, for example, that can determine which action to provide to the user in a ribbon. As mentioned, in some embodiments two or more options can be presented concurrently. A ribbon can also contain an option that enables the user to view other available actions, and select one or more of those actions to be performed.

Figure 5:
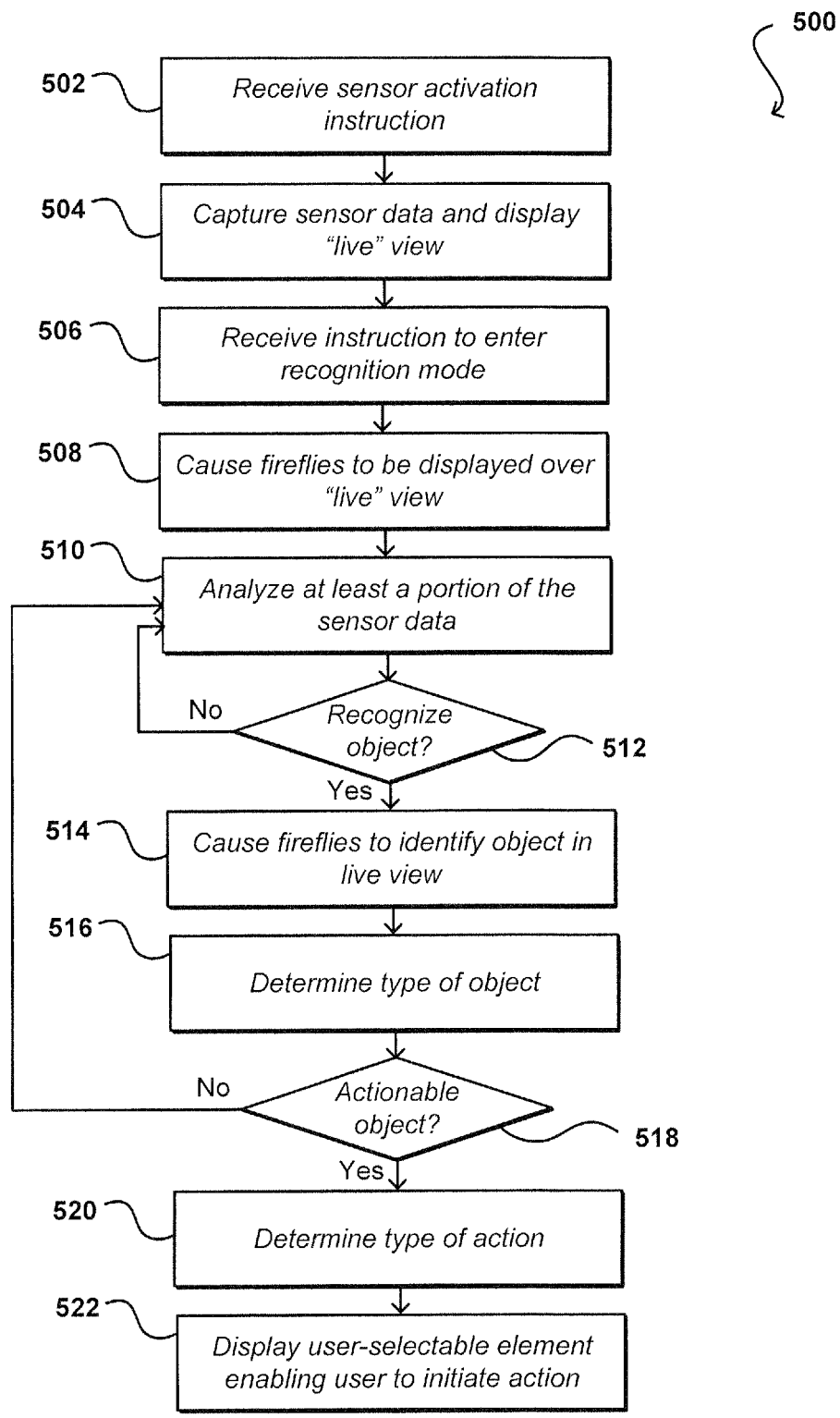
FIG. 5 illustrates an example process for enabling a user to select an action for a recognized object that can be used in accordance with various embodiments.

FIG. 5 illustrates an example process 500 for recognizing objects and enabling actions to be performed with respect to those objects that can be utilized in accordance with various embodiments. It should be understood that, for any process discussed herein, there can be additional, fewer, or alternative steps performed in similar or alternative orders, or in parallel, within the scope of the various embodiments unless otherwise stated. In this example, a sensor activation instruction is received 502. This can include at least one hardware and/or software instruction generated automatically on a computing device containing one or more sensors, an instruction generated in response to a user input, or another such instruction. In response, the device can capture 504 or otherwise acquire sensor data, which as discussed can include data such as audio data, video data, image data, position data, and the like. The device can also display a "live" view of captured video on a display of the device, where the live view corresponds to the view of a selected camera as indicated by images captured by that camera and then displayed, with relatively little delay, on a display screen of the device. It should be understood that the "live" view can have a slight delay due to the time needed to capture, read, and provide the image for display.

While the sensors are active, in at least some embodiments, a subsequent instruction can be received 506 that causes the computing device to enter what is referred to herein as a recognition mode, or another such state. While in the recognition mode, the computing device can cause a group of "fireflies" or other such graphical elements to be displayed 508 over, or along with, the live view of images captured by the designated camera(s). The live view in some embodiments can include a single image stream from a single camera, multiple image streams from multiple cameras, or a three-dimensional stream from one or more stereoscopic cameras, among other such options. While the fireflies are moving and/or flashing about the display, at least a portion of the captured sensor data can be analyzed 510 to attempt to recognize at least one object based at least in part upon a representation of the object in the sensor data. If an object is not recognized 512, the process can continue. If an object is recognized, at least a subset or group of fireflies can be caused 514 to identify the representation of the recognized object, such as by bounding the representation in the live view or otherwise adjusting one or more aspects (e.g., colors, movements, etc.) to indicate recognition. As mentioned, some of the fireflies can appear to move to an animated bounding box proximate a representation of an item, while other fireflies can appear or flash at the bounding box, among other such options. During or around the time that the fireflies identify recognition of the object, the device (or a computing system in communication with the device) can attempt to determine 516 a type of the object. This can include at least whether the object is an actionable object, and in at least some embodiments can identify whether the object is a text string, URL, phone number, song, movie, location, video file, email address, product, or other such object type. If the object is determined 518 to not be of an actionable type, for example, the process can continue. If the object is determined to be of an actionable type, the type of action for that object can be determined 520. This can include, for example, an action for dialing a number, emailing or opening an address, identifying a song, downloading a movie, launching a video file, or other such actions as discussed and suggested elsewhere herein. As discussed, for an object with multiple associated actions at least one action can be selected for that object. Also, in some embodiments one or more actions can be determined for each recognized object, whether or not the object is determined to be actionable. Once an action is determined, a ribbon or other such user-selectable icon can be generated and displayed 522, which enables the user to initiate the action with respect to the object. If the ribbon is a new ribbon or a previously-generated ribbon that is not currently displayed, the ribbon can be caused to be displayed and the displayed ribbons can be adjusted as appropriate, such as to move the ribbons down or across a stack or arrangement of ribbons, which can be navigable by a user in at least some embodiments.

Figure 6:
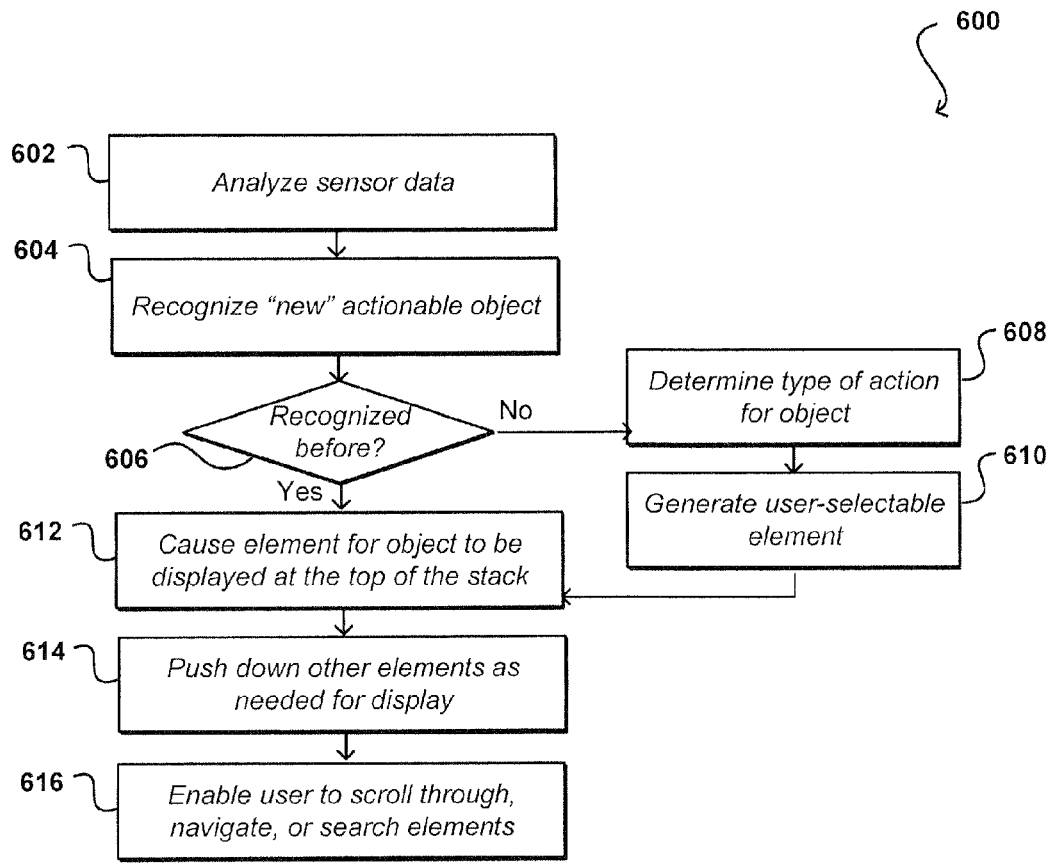
FIG. 6 illustrates an example process for updating actions for recognized objects that can be utilized in accordance with various embodiments.

As an example, FIG. 6 illustrates an example process 600 for updating displayed user-selectable icons that can be utilized in accordance with various embodiments. In this example, the captured sensor data is analyzed 602, as discussed with respect to the process of FIG. 5. A representation of a new object can be recognized 604 in the sensor data. This new object can be an object not encountered by the device before, or at least not encountered in the sensor data in a recent period of time, such that any user-selectable icon for the object is not currently displayed. A determination can be made 606 as to whether the object was previously recognized. If not, a type of action for a type of the object can be determined 608. A user-selectable icon for the object can also be generated 610, including one or more actions if the object is determined to be actionable. If the object was previously recognized, the previously determined action can be utilized with the user-selectable icon. A user-selectable icon for the object can be caused 612 to be displayed at the top of the element stack, or at another appropriate location as discussed and suggested herein. Other elements can be pushed down 614 as needed for the display, such as where the number of elements exceeds a threshold. A user can then be enabled 616 to scroll through, search, or otherwise navigate through the user-selectable icons. As mentioned, user-selectable icons that are no longer displayed on the screen can be "archived" such that information for those elements can be accessible for such navigation, as well as other such purposes.

In at least some embodiments, a user can utilize a search option to locate information from archived user-selectable icons, or elements that are otherwise not displayed at the current time. In some embodiments, entering into detection mode can cause the most recent user-selectable icon(s) to be displayed and then immediately archived or otherwise moved off screen, in order to indicate to, or remind, the user that there are archived elements off screen. In some embodiments elements for objects identified to be relevant to a current environment or surrounding of the device are shown at any given time. The user can scroll or otherwise navigate through the elements, to potentially view every element that has been generated and obtain the related information. Various other ways of navigating or accessing this element history can be utilized as well. These elements can be sorted using any appropriate criterion, such as creation date, date of last access, distance of creation from current location, etc. In some embodiments the history can include other elements as well, such as elements associated with objects known to be in a vicinity of the user at the current time, or a future time, as may be based upon detections from other users or other devices of the same user. In some embodiments, a user starting to scroll or navigate through the archived elements can cause the device to enter an "identifying" or other such mode, wherein the sensors stops capturing sensor data and/or the captured sensor data is not analyzed, and a search bar (or other search mechanism) can appear on the screen, such as by dropping down from a top of the display. In some embodiments, a search bar can appear when the user causes more than about 50%-60% of the screen to contain elements, although various other criteria can be utilized as well. The user can search using various types of metrics, such as object type, action type, date of access, object name, action name, location of object, and the like.

In at least some embodiments, the user-selectable icon generation software can be stored on the computing device and/or remote from the device, such as may be offered as a Web service. In some embodiments, an interface such as one or more application programming interfaces (APIs) can be used to help obtain identifying information for an object, such as by providing images and description of an object. Such interfaces can also enable third party systems and services to plug into the system and help to identify objects, provide information for objects, or enable specific actions for objects, among other such possibilities.

Figure 7:
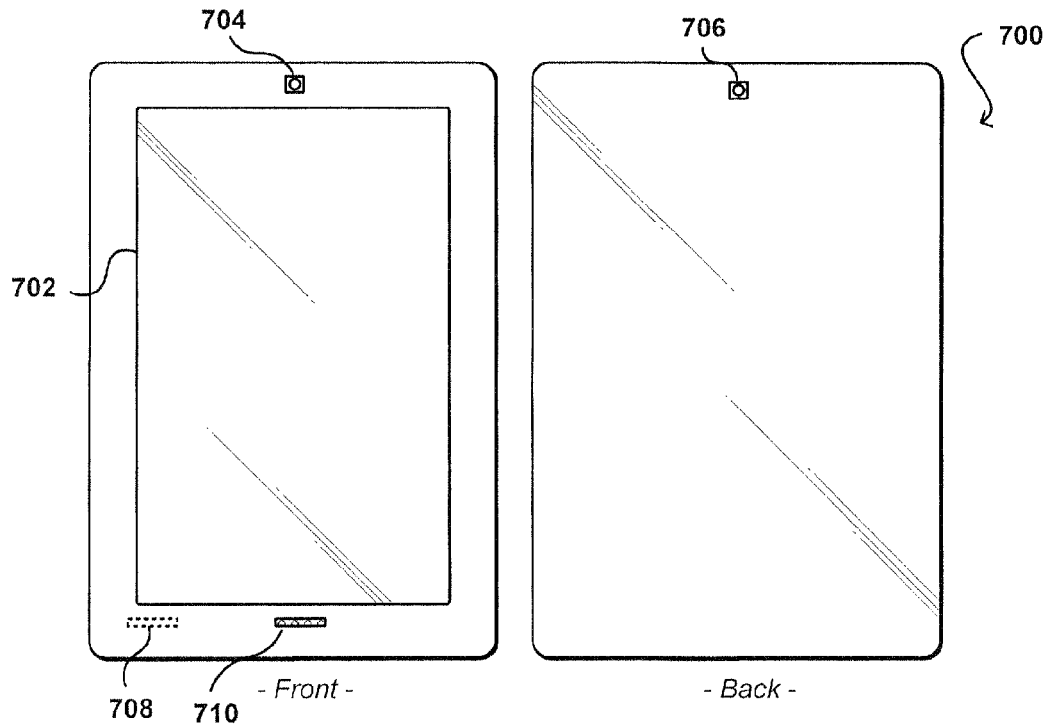
FIG. 7 illustrates an example computing device that can be used in accordance with various embodiments.

FIG. 7 illustrates an example computing device 700 that can be used to perform methods in accordance with various embodiments discussed and suggested herein. In this example, the device has a primary display screen 702 for displaying information and content to a user. The device also has two cameras 704, 706 positioned at the front and back faces of the device, respectively. It should be understood that fewer or additional cameras or other such image capture elements or sensors can be positioned at various other locations on such a device as well. In this example, each capture element is a camera capable of capturing image information over a visible and/or infrared (IR) spectrum, and in at least some embodiments can select between operational modes. It should be understood, however, that there can be fewer or additional elements of similar or alternative types in other embodiments, and that there can be combinations of cameras, infrared detectors, gesture sensors, and other such elements used with various devices.

In this example, a light sensor can be used to determine an amount of light in a general direction of objects to be captured. At least one illumination element, such as a white light emitting diode (LED) or infrared (IR) emitter, can be used to provide illumination in a particular range of directions when, for example, there is insufficient light as determined by the light sensor. In some embodiments, there can be an emitter for each of the image capture elements, with each emitter positioned proximate the respective image capture element. Various other elements and combinations of elements can be used as well within the scope of the various embodiments as should be apparent in light of the teachings and suggestions contained herein. The device can include at least one networking component 708, enabling the device to communicate with at least one remote system or service, such as may be used to identify objects or obtain information relating to identified objects. The device also can include at least one microphone 710 or other such sensor for capturing audio data.

Figure 8:
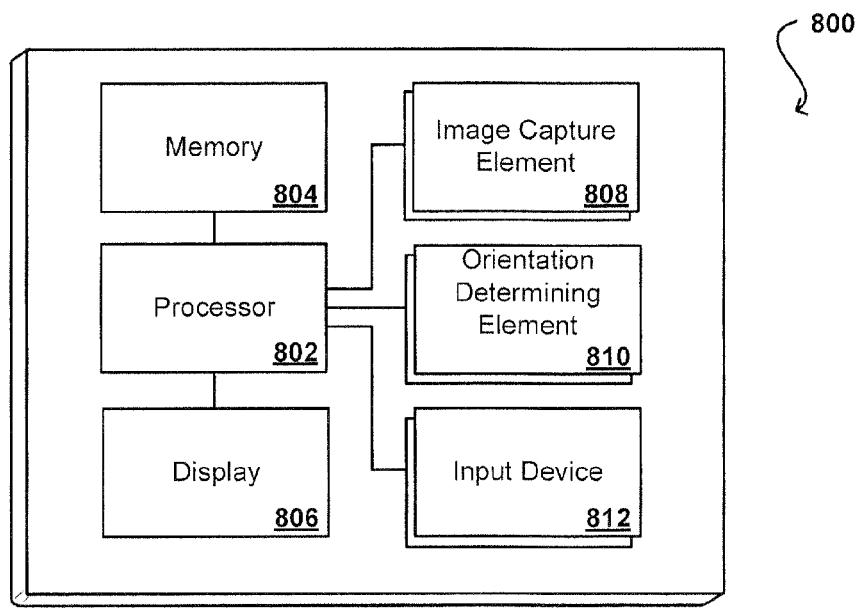
FIG. 8 illustrates an example configuration of components of a computing device such as that illustrated in FIG. 7.

In order to provide various functionality described herein, FIG. 8 illustrates an example set of basic components of a computing device 800, such as the device 700 described with respect to FIG. 7. In this example, the device includes at least one central processor 802 for executing instructions that can be stored in at least one memory device or element 804. As would be apparent to one of ordinary skill in the art, the device can include many types of memory, data storage or other type of non-transitory computer-readable storage media, such as a first data storage for program instructions for execution by the processor 802, the same or separate storage can be used for images or data, a removable storage memory can be available for sharing information with other devices, etc. The device typically will include some type of display element 806, such as a touch screen, electronic ink (e-ink), organic light emitting diode (OLED) or liquid crystal display (LCD), although devices such as portable media players might convey information via other means, such as through audio speakers. In at least some embodiments, the display screen provides for touch or swipe-based input using, for example, capacitive or resistive touch technology.

As discussed, the device in many embodiments will include at least one image capture element 808, such as one or more cameras that are able to image a user, people, or objects in the vicinity of the device. An image capture element can include, or be based at least in part upon any appropriate technology, such as a CCD or CMOS image capture element having a determined resolution, focal range, viewable area, and capture rate. The example device includes at least one orientation determining component 810, such as an electronic gyroscope used to determine motion of the device for assistance in acquiring focused images. The device also can include at least one illumination element, as may include one or more light sources (e.g., white light LEDs, IR emitters, or flash lamps) for providing illumination and/or one or more light sensors or detectors for detecting ambient light or intensity, etc.

The example device can include at least one additional input device 812 able to receive conventional input from a user. This conventional input can include, for example, a push button, touch pad, touch screen, wheel, joystick, keypad, mouse, trackball, keypad or any other such device or element whereby a user can input a command to the device. These I/O devices could even be connected by a wireless infrared or Bluetooth or other link as well in some embodiments. In some embodiments, however, such a device might not include any buttons at all and might be controlled only through a combination of visual (e.g., gesture) and audio (e.g., spoken) commands such that a user can control the device without having to be in contact with the device.

Figure 9:
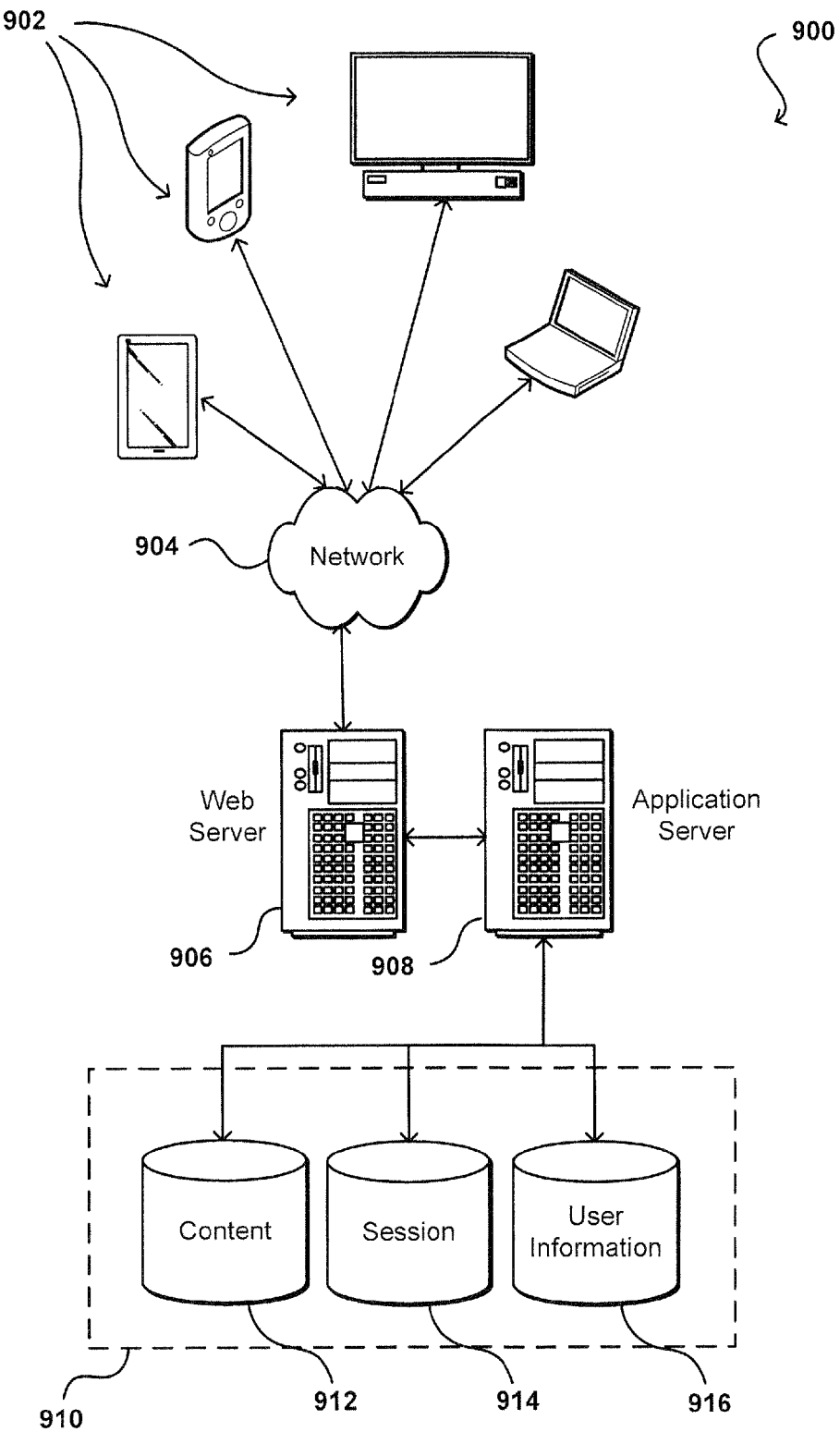
FIG. 9 illustrates an example environment in which various embodiments can be implemented.

As discussed, different approaches can be implemented in various environments in accordance with the described embodiments. For example, FIG. 9 illustrates an example of an environment 900 for implementing aspects in accordance with various embodiments. As will be appreciated, although a Web-based environment is used for purposes of explanation, different environments may be used, as appropriate, to implement various embodiments. The system includes an electronic client device 902, which can include any appropriate device operable to send and receive requests, messages or information over an appropriate network 904 and convey information back to a user of the device. Examples of such client devices include personal computers, cell phones, handheld messaging devices, laptop computers, set-top boxes, personal data assistants, electronic book readers and the like. The network can include any appropriate network, including an intranet, the Internet, a cellular network, a local area network or any other such network or combination thereof. Components used for such a system can depend at least in part upon the type of network and/or environment selected. Protocols and components for communicating via such a network are well known and will not be discussed herein in detail. Communication over the network can be enabled via wired or wireless connections and combinations thereof. In this example, the network includes the Internet, as the environment includes a Web server 906 for receiving requests and serving content in response thereto, although for other networks, an alternative device serving a similar purpose could be used, as would be apparent to one of ordinary skill in the art.

The illustrative environment includes at least one application server 908 and a data store 910. It should be understood that there can be several application servers, layers or other elements, processes or components, which may be chained or otherwise configured, which can interact to perform tasks such as obtaining data from an appropriate data store. As used herein, the term "data store" refers to any device or combination of devices capable of storing, accessing and retrieving data, which may include any combination and number of data servers, databases, data storage devices and data storage media, in any standard, distributed or clustered environment. The application server 908 can include any appropriate hardware and software for integrating with the data store 910 as needed to execute aspects of one or more applications for the client device and handling a majority of the data access and business logic for an application. The application server provides access control services in cooperation with the data store and is able to generate content such as text, graphics, audio and/or video to be transferred to the user, which may be served to the user by the Web server 906 in the form of HTML, XML or another appropriate structured language in this example. The handling of all requests and responses, as well as the delivery of content between the client device 902 and the application server 908, can be handled by the Web server 906. It should be understood that the Web and application servers are not required and are merely example components, as structured code discussed herein can be executed on any appropriate device or host machine as discussed elsewhere herein.

The data store 910 can include several separate data tables, databases or other data storage mechanisms and media for storing data relating to a particular aspect. For example, the data store illustrated includes mechanisms for storing content (e.g., production data) 912 and user information 916, which can be used to serve content for the production side. The data store is also shown to include a mechanism for storing log or session data 914. It should be understood that there can be many other aspects that may need to be stored in the data store, such as page image information and access rights information, which can be stored in any of the above listed mechanisms as appropriate or in additional mechanisms in the data store 910. The data store 910 is operable, through logic associated therewith, to receive instructions from the application server 908 and obtain, update or otherwise process data in response thereto. In one example, a user might submit a search request for a certain type of item. In this case, the data store might access the user information to verify the identity of the user and can access the catalog detail information to obtain information about items of that type. The information can then be returned to the user, such as in a results listing on a Web page that the user is able to view via a browser on the user device 902. Information for a particular item of interest can be viewed in a dedicated page or window of the browser.

Each server typically will include an operating system that provides executable program instructions for the general administration and operation of that server and typically will include computer-readable medium storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 9. Thus, the depiction of the system 900 in FIG. 9 should be taken as being illustrative in nature and not limiting to the scope of the disclosure.

The various embodiments can be further implemented in a wide variety of operating environments, which in some cases can include one or more user computers or computing devices which can be used to operate any of a number of applications. User or client devices can include any of a number of general purpose personal computers, such as desktop or laptop computers running a standard operating system, as well as cellular, wireless and handheld devices running mobile software and capable of supporting a number of networking and messaging protocols. Such a system can also include a number of workstations running any of a variety of commercially-available operating systems and other known applications for purposes such as development and database management. These devices can also include other electronic devices, such as dummy terminals, thin-clients, gaming systems and other devices capable of communicating via a network.

Most embodiments utilize at least one network that would be familiar to those skilled in the art for supporting communications using any of a variety of commercially-available protocols, such as TCP/IP, FTP, UPnP, NFS, and CIFS. The network can be, for example, a local area network, a wide-area network, a virtual private network, the Internet, an intranet, an extranet, a public switched telephone network, an infrared network, a wireless network and any combination thereof.

In embodiments utilizing a Web server, the Web server can run any of a variety of server or mid-tier applications, including HTTP servers, FTP servers, CGI servers, data servers, Java servers and business application servers. The server(s) may also be capable of executing programs or scripts in response requests from user devices, such as by executing one or more Web applications that may be implemented as one or more scripts or programs written in any programming language, such as Java®, C, C# or C++ or any scripting language, such as Perl, Python or TCL, as well as combinations thereof. The server(s) may also include database servers, including without limitation those commercially available from Oracle®, Microsoft®, Sybase® and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keypad, controller, touch-sensitive display element or keypad) and at least one output device (e.g., a display device, printer or speaker). Such a system may also include one or more storage devices, such as disk drives, optical storage devices and solid-state storage devices such as random access memory (RAM) or read-only memory (ROM), as well as removable media devices, memory cards, flash cards, etc.

Such devices can also include a computer-readable storage media reader, a communications device (e.g., a modem, a network card (wireless or wired), an infrared communication device) and working memory as described above. The computer-readable storage media reader can be connected with, or configured to receive, a non-transitory computer-readable storage medium representing remote, local, fixed and/or removable storage devices as well as storage media for temporarily and/or more permanently containing, storing, and retrieving computer-readable information. The system and various devices also typically will include a number of software applications, modules, services or other elements located within at least one working memory device, including an operating system and application programs such as a client application or Web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and other non-transitory computer-readable media for containing code, or portions of code, can include any appropriate media known or used in the art, including storage media and communication media, such as but not limited to volatile and non-volatile, removable and non-removable media implemented in any method or technology for storage of information such as computer readable instructions, data structures, program modules or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A computing device, comprising:
   at least one processor;
   a display screen;
   at least one camera; and
   at least one memory including instructions that, when executed by the at least one processor, cause the computing device to:
      receive image data using the at least one camera;
      present, on the display screen, an image corresponding to the image data;
      determine, based on object recognition processing, a first representation of a first object in the image data;
      determining, based on object recognition processing, a second representation of a second object in the image data;
      cause, on the display screen, a first plurality of graphical elements to indicate the first representation has been determined;
      cause, on the display screen a second plurality of graphical elements to indicate the second representation has been determined;
      present, on the display screen while the first plurality of graphical elements indicate the first representation has been determined, a first user-selectable icon indicating a first action that the computing device is configured to perform with respect to the first object; and
      present, on the display screen while the second plurality of graphical elements indicate the second representation has been determined, a second user-selectable icon indicating a second action that the computing device is configured to perform with respect to the second object, the second user-selectable icon being presented adjacent to the first user-selectable icon.

2. The computing device of claim 1, wherein the instructions, when executed by the at least one processor, further cause the computing device to:
   receive audio data using a microphone of the computing device; and
   present, on the display screen and based on the audio data, a third user-selectable icon indicating a third action that the computing device is configured to perform.

3. The computing device of claim 1, wherein the instructions, when executed by the at least one processor, further cause the computing device to:
   present the first user-selectable icon to appear to be stacked on top of the second user-selectable icon on the display screen.

4. The computing device of claim 1, wherein the instructions, when executed by the at least one processor, further cause the computing device to:
   store information for a previously-displayed user-selectable icon; and
   present, on the display screen and based on a user performing a swiping motion on the display screen, the previously-displayed user-selectable icon.

5. The computing device of claim 1, wherein the instructions, when executed by the at least one processor, further cause the computing device to:
   provide a search option enabling a search to be executed with respect to information stored for any currently displayed user-selectable icon and any previously-displayed user-selectable icon.

6. A computer-implemented method, comprising:
   receiving sensor data using at least one sensor of a computing device;
   determining, based on object recognition processing, a first representation of a first object in the sensor data;
   determining, based on object recognition processing, a second representation of a second object in the sensor data;
   causing, on a display screen of the computing device, a first plurality of graphical elements to indicate that the first representation has been determined;
   causing, on the display screen, a second plurality of the graphical elements to indicate that the second representation has been determined;
   presenting, on the display screen while the first plurality of graphical elements indicate the first representation has been determined, a first user-selectable icon indicating a first action that the computing device is configured to perform with respect to the first object; and
   presenting, on the display screen while the second plurality of graphical elements indicate the second representation has been determined, a second user-selectable icon indicating a second action that the computing device is configured to perform with respect to the second object, the second user-selectable icon being presented adjacent to the first user-selectable icon on the display screen.

7. The computer-implemented method of claim 6, further comprising:
presenting the first user-selectable icon on the display screen for at least a period of time after the first representation is no longer presented on the display screen.

8. The computer-implemented method of claim 6, wherein causing the first plurality of graphical elements to indicate the first representation has been determined comprises:
causing the first plurality of graphical elements to form a bounding box around the first a representation on the display screen.

9. The computer-implemented method of claim 6, further comprising:
removing at least one user-selectable icon from the display screen in response to an additional user-selectable icon causing a number of user-selectable icons presented on the display screen to exceed a threshold number of user-selectable icons.

10. The computer-implemented method of claim 9, further comprising:
storing information for any user-selectable icon no longer presented on the display screen, wherein the information is accessible using at least one of a scroll action, a touch-screen-based pull action, or a search request.

11. The computer-implemented method of claim 6, wherein presenting the first user-selectable icon is performed using information previously stored associated with the first object.

12. The computer-implemented method of claim 6, wherein the first user-selectable icon and the second user-selectable icon are presented as at least one of stacked or positioned in a sequence.

13. The computer-implemented method of claim 6, wherein the first object is associated with the first action and a third action, and wherein the first action is conveyed by the first user-selectable icon based at least in part upon historical data associated with a user.

14. The computer-implemented method of claim 6, wherein the first user-selectable icon is presented at a location on the display screen based upon at least one of a first location corresponding to the first representation and a second location corresponding to the second representation, a first type corresponding to the first object, historical user data, a date of last access, or times at which the first user-selectable icon and the second user-selectable icon were generated.

15. A computing device, comprising:
at least one processor;
a display screen;
at least one sensor; and
at least one memory including instructions that, when executed by the at least one processor, cause the computing device to:
receive sensor data using the at least one sensor;
determine, based on object recognition processing, a first representation of a first object in the sensor data;
determine, based on object recognition processing, a second representation of a second object in the sensor data;
cause, on the display screen, a first plurality of graphical elements to indicate the first representation has been determined;
cause, on the display screen, a second plurality of the graphical elements to indicate the second representation has been determined;
present, on the display screen while the first plurality of graphical elements indicate the first representation has been determined, a first user-selectable icon indicating a first action that the computing device is configured to perform with respect to the first object; and
present, on the display screen while the second plurality of graphical elements indicate the second representation has been determined, a second user-selectable icon indicating a second action that the computing device is configured to perform with respect to the second object, the second user-selectable icon being presented adjacent to the first user-selectable icon on the display screen.

16. The computing device of claim 15, wherein the instructions, when executed by the at least one processor to, further cause the computing device to:
present the first user-selectable icon on the display screen for at least a period of time after the first representation is no longer presented on the display screen.

17. The computing device of claim 15, wherein the instructions, when executed by the at least one processor, causing the computing device to cause the first plurality of graphical elements to indicate the first representation has been determined further include instructions to:
cause the first plurality of graphical elements to form a bounding box around the first representation on the display screen.

* * * * *